US006899833B2

(12) United States Patent
Bellasalma

(10) Patent No.: US 6,899,833 B2
(45) Date of Patent: May 31, 2005

(54) METHOD OF MANUFACTURING A MOLDED ARTICLE USING A VARIABLE FEEDBACK MOLDING SYSTEM

(75) Inventor: Gerard Jay Bellasalma, Yorba Linda, CA (US)

(73) Assignee: Masco Corporation, Taylor, MI (US)

( * ) Notice: Subject to any disclaimer, the term of this patent is extended or adjusted under 35 U.S.C. 154(b) by 233 days.

(21) Appl. No.: 10/134,231

(22) Filed: Apr. 29, 2002

(65) Prior Publication Data

US 2003/0201559 A1 Oct. 30, 2003

(51) Int. Cl.[7] .......................... B29C 31/06; B29C 31/10; B29C 45/54; B29C 45/77
(52) U.S. Cl. ................ 264/40.1; 264/40.5; 264/102; 264/310; 264/328.8; 264/328.11; 264/328.13; 425/130; 425/146; 425/147; 425/149; 425/546; 425/812
(58) Field of Search .................... 264/40.1, 40.5, 264/102, 310, 328.11, 328.13, 328.8; 425/146, 147, 149, 130, 546, 812

(56) References Cited

U.S. PATENT DOCUMENTS

| | | | | |
|---|---|---|---|---|
| 3,937,776 A | * | 2/1976 | Hold et al. ................ 264/40.4 |
| 3,984,510 A | * | 10/1976 | Chandra et al. ........... 264/40.1 |
| 4,285,903 A | * | 8/1981 | Lemelson .................. 264/310 |
| 4,359,435 A | * | 11/1982 | Kogure ..................... 264/40.5 |
| 4,399,105 A | * | 8/1983 | Tilgner et al. .............. 422/111 |
| 4,735,760 A | * | 4/1988 | Kumazaki .................. 264/40.5 |
| 5,221,509 A | * | 6/1993 | Fujimoto et al. ......... 264/328.7 |
| 5,316,701 A | * | 5/1994 | Payne ....................... 264/1.24 |
| 5,704,413 A | * | 1/1998 | Takasaki et al. ............ 164/136 |
| 5,804,125 A | * | 9/1998 | Aepli ......................... 264/310 |
| 5,902,525 A | * | 5/1999 | Hettinga ................... 264/40.1 |

FOREIGN PATENT DOCUMENTS

JP 62-085920 A * 4/1987 ........... B29C/45/50

OTHER PUBLICATIONS

JPO Abstract of JP 62–085920 A, 1998, Japanese Patent Office.*

* cited by examiner

Primary Examiner—Michael P. Colaianni
Assistant Examiner—Michael I. Poe
(74) Attorney, Agent, or Firm—Carlson, Gaskey & Olds

(57) ABSTRACT

A method of manufacturing a molded article from a settable mixture includes the steps of in-taking a plurality of components into a plurality of separate material discharge containers sized relative to each other to provide the required mix ratio of the settable mixture. The components contained in the material discharge containers are discharged to a mold tool through a mixing head that receives each of the components separately and thoroughly mixes them into the settable mixture. The settable mixture flows from the mixing head to fill the mold tool. The mold tool rotates about an axis during the filling step to evacuate air from the mold tool. Pressure of the settable mixture is monitored during the filling step and rate of discharge of the settable component is varied in response to changes in pressure of the settable mixture.

19 Claims, 5 Drawing Sheets

METHOD OF MANUFACTURING A MOLDED ARTICLE USING A VARIABLE FEEDBACK MOLDING SYSTEM

BACKGROUND OF THE INVENTION

This invention relates to a method of fabricating a molded article, and particularly to a method of delivering a settable mixture to a mold tool.

Many methods of fabricating molded articles include the mixing of at least two fluid materials to from a settable mixture that is discharged into a mold tool. The fluid materials typically include at least two reactive components that harden when mixed. Variations in mold tool temperature, settable mixture components and injection speeds can cause variations between molded articles fabricated using the same molding system.

A further challenge to current molding operations is the evacuation of air initially trapped within a mold. Typically an air passage is provided for the evacuation of air from a mold tool as the settable mixture is discharged into the mold tool. Air is expelled from the mold by the introduction of the settable mixture into the mold. For molded articles with simple shapes such an air exhaust passages is adequate. However, for molded shapes having extreme and dramatic shapes and contours air can become trapped within the mold. Further, the completed molded article may include cosmetically important surfaces that preclude the optimum placement of air exhaust passages. The entrapment of air within the mold tool causes voids to be present within the completed molded article, which provides an undesirable appearance and weakens the final molded product.

For these reasons it is desirable to develop a molding system that can accommodate variations in the molding process to provide a consistent, reliable and repeatable molding process.

SUMMARY OF THE INVENTION

An embodiment of this discloses a method of fabricating a molded article utilizing a low pressure molding process that varies a discharge rate of settable material in response to pressure in the mold tool to accurately control each molding sequence.

The system includes a two-part mold having a first part supported by a structure and a second movable part. The molded article is formed from a three-part mixture mixed by a mixing head. The fluid materials that compose the three-part mixture are stored in separate storage containers. The fluid materials are drawn from the storage containers by a material delivery system. The material delivery system includes a separate cylinder for each fluid material that forms the three-part mixture. Each cylinder is of a volume that is pre-sized to provide the correct ratio of fluid material required to form the settable mixture.

The material delivery system delivers the fluid material to the mold through the mixing head. The mixing head thoroughly mixes the fluid material and discharges the mixed components in the form of the settable mixture into the mold tool. Upon hardening of the settable mixture the molded article is removed and the mold is prepared for the fabrication of another molded article.

A sensor located within the mold monitors pressure of the settable mixture. The material delivery system varies the rate of discharge of fluid material to the mold tool through the mixing head in response to changes in pressure. As the pressure of the settable mixture increases, the rate of discharge is proportionally slowed to accurately control each discharge sequence from each material discharge container. The greater the pressure within the mold tool the slower the fluid material is discharged.

The method of fabricating a molded article of this invention provides a consistent, reliable and repeatable molding process for fabricating molded articles by varying the discharge rate of settable mixture into the mold tool to accommodate variations in the molding process.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
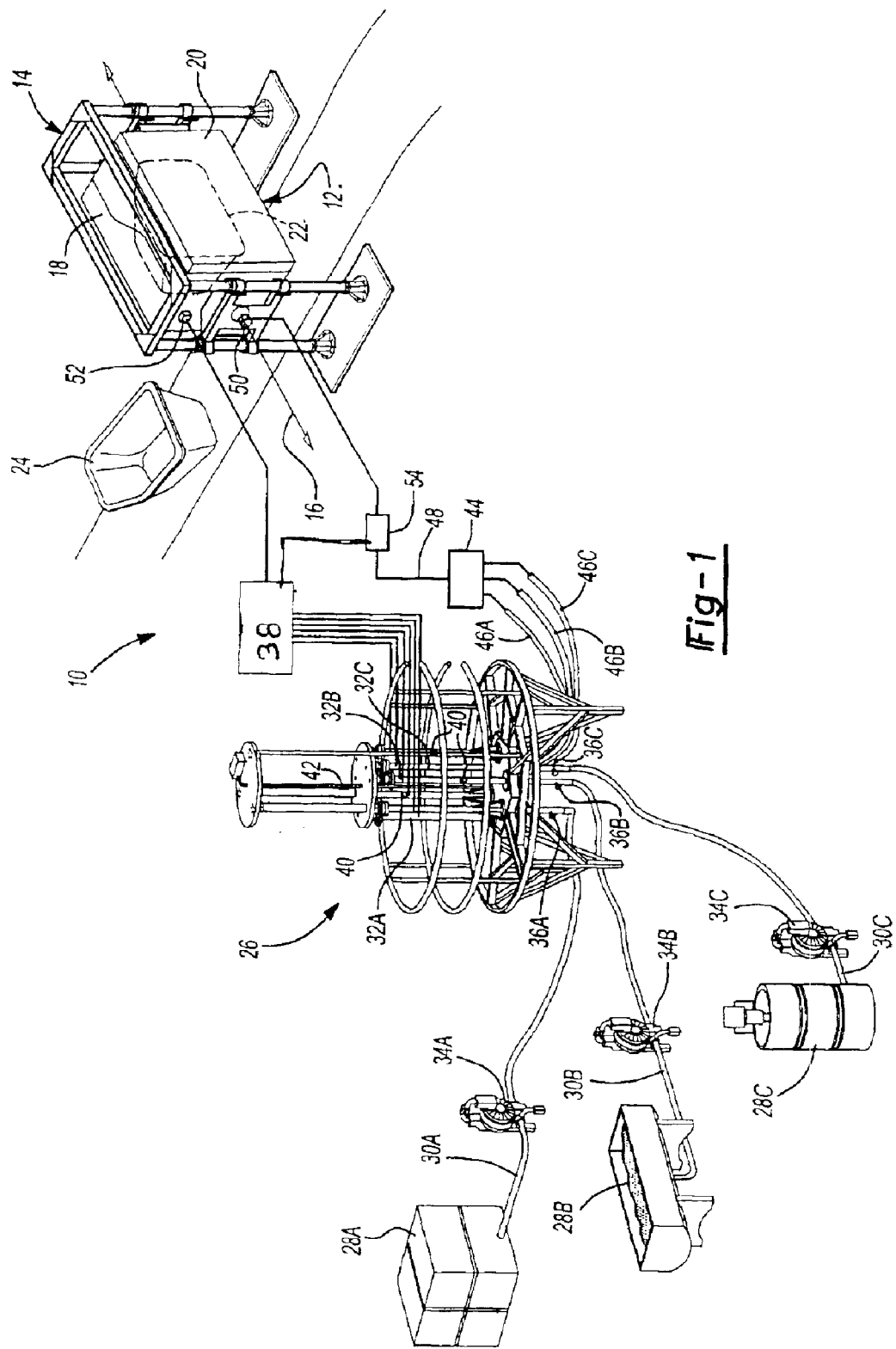
FIG. 1 is a schematic view of the molding system.

Referring to FIG. 1, one disclosed embodiment is a method of fabricating a molded article with a molding system 10 including a mold tool 12 supported by a structure 14 such that the mold tool 12 maybe rotated about a horizontal axis 16. The mold tool 12 includes a first mold part 18 and a second mold part 20 that are secured together to form a cavity 22 therebetween. Preferably, at least one of the mold parts 18,20 is movable away from the structure 14 to allow for demolding of the completed molded article 24.

The molding system 10 further includes a material delivery system 26, and fluid material storage containers 28A, 28B, and 28C. Fluid materials to form the settable mixture are stored in the storage containers 28A–C and include delivery hoses 30 A–C attached to material discharge containers 32 A–C included in the material delivery system 26. Preferably the fluid materials that compose the settable mixture include a catalyst, a foaming agent, and a matrix polymer. It is within the contemplation of this invention that other fluid materials may be used to form the settable mixture.

Fluid pumps 34 A–C disposed along the delivery hoses 30 A–C aid in moving fluid from the storage containers 28 A–C to corresponding material discharge containers 32 A–C. Each of the material discharge containers 32 A–C includes valve assemblies 36 A–C to control the intake and discharge of fluid material. Preferably a controller 38 actuates the valve assemblies to 36 A–C to allow filling of the material discharge containers 32 A–C. A worker skilled in the art would understand that the pump and valve assemblies may be of any type known by one skilled in the art.

Figure 1A:
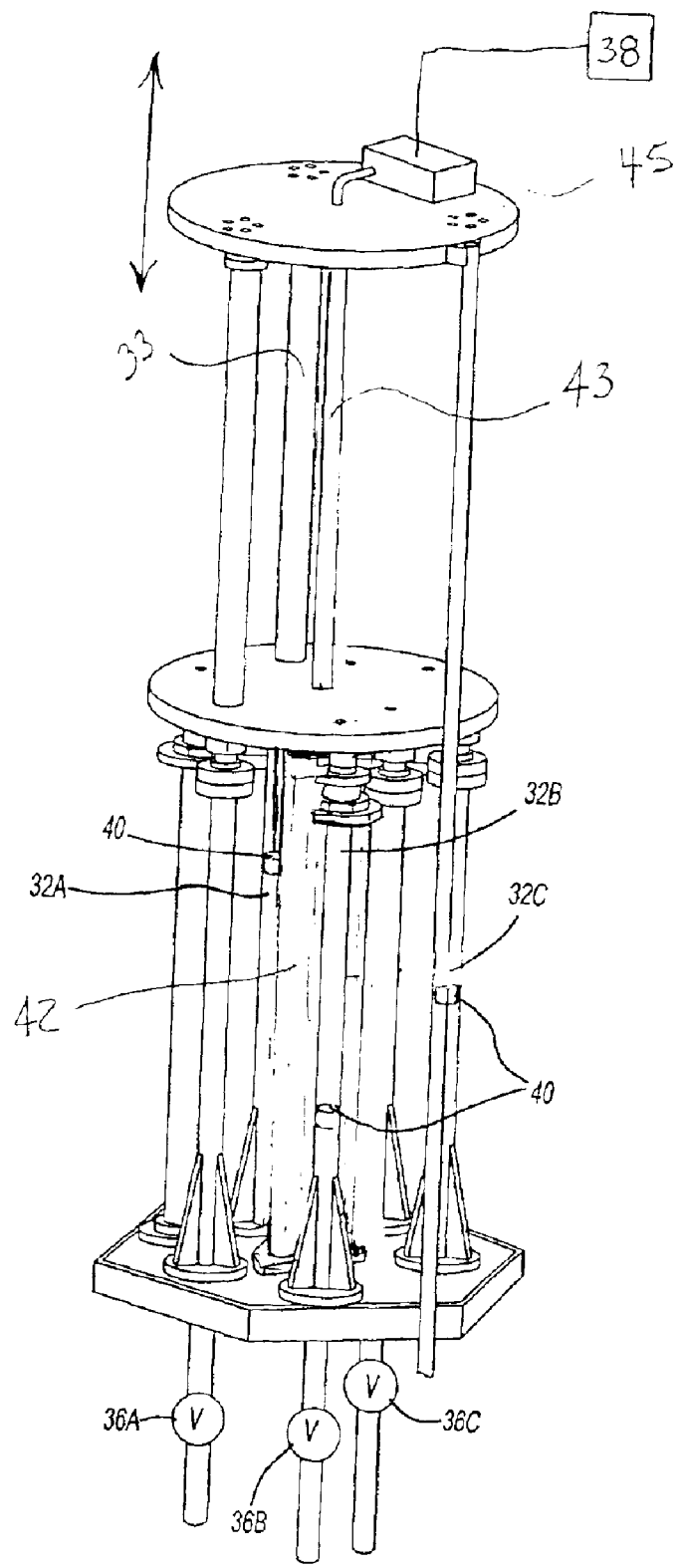
FIG. 1A is a perspective view of the material discharge containers.

Referring to FIG. 1A, the material discharge containers 32A–C are sized relative to one another such that one shot of fluid material contained from each container 32 A–C provides a predetermined ratio required to form the settable mixture. Each material discharge container 32 A–C is sized to contain a predetermined volume of fluid material based upon the desired ratio that must be mixed to create the settable mixture. Further, multiple material discharge containers containing the same fluid material component can be used to provide the proper ration for the settable mixture. In this way the fluid material component that makes up the largest portion of the settable mixture will fill multiple containers instead of one container much larger relative to the other material discharge containers.

Each material discharge container includes a piston 40 attached to a piston rod 33 that is in turn attached to a drive plate 45. Note that each material discharge container includes a piston rod attached to the piston 40, however in FIG. 1A some of the piston rods 33 are not shown to improve clarity. A drive 42 actuates the drive plate 45 thereby moving the pistons 40 within the material discharge containers 32 A–C. Preferably the drive 42 hydraulic cylinder disposed centrally within the material delivery system 26 and includes a drive rod 43 attached to the drive plate 45. Actuating the drive 42 to move the drive plate 45 actuates the pistons 40 to draw into or expel fluid material from the material discharge containers 32 A–C. A controller 38 actuates the drive 42 to provide a required discharge rate to the mold tool 12 depending on application specific molding requirements. The material discharge system is described in further detail in the co-pending application Ser. No. 09/662,302 titled "Rapid Discharge Multiple Material Delivery System" that is hereby incorporated by reference. Fluid material from the material discharge containers 32A–C flows through discharge hoses 40 A–C to a mixing head 44.

Referring back to FIG. 1, the mixing head 44 thoroughly mixes the various separate fluid materials to form the settable mixture. The mixing head 44 is best described in pending application Ser. No. 09/662,662 titled "Mix Head Assembly for a Molding Material Delivery System". The settable mixture flows from the mixing head 44 through a single hose 48 to a mold valve 50 of the mold tool 12.

The controller 38 controls movement of the drive 42 and actuation of the valve assemblies 36 A–C. A sensor 52 for monitoring pressure of the settable mixture is disposed within the mold tool 12. A second sensor 54 can also be positioned to monitor pressure in the hose 48 between the mixing head 44 and the mold tool 12. Each sensor 52, 54 communicates fluid pressure levels to the controller 38. The sensors 52, 54 and the controller 38 are of conventional construction and would be recognized as such by a worker skilled in the art.

In operation, the molding process is initiated by intaking fluid material from the storage containers 28 A–C to the material discharge containers 32A–C. Fluid is drawn into each of the material discharge containers 32A–C by driving the piston 40 upward with the drive 42. Fluid flow between the storage containers 28 A–C and the material discharge containers 32 A–C is aided by the fluid pumps 34A–C. The controller 38 actuates the valve assemblies 36 A–C to fill each of the material discharge containers 32 A–C. The delivery system 26 is now ready to discharge the components to the mixing head 44.

Referring to FIGS. 1, and 2 A–C, the second mold part 18 is first moved into a position adjacent the first mold part 20. The first and second mold parts 18,20 are then secured together and lifted to a first position I (FIG. 2B). The mix head 44 is connected to the mold valve 50 of the mold tool 12 by way of the hose 48. The controller 38 opens the mold valve 50 and actuates the valve assemblies 36 A–C to allow flow of the fluid material to the mold tool 12.

The molding process continues with the controller 38 actuating the drive 42 such that the pistons 40 discharge the fluid material from the material discharge containers 32 A–C to the mixing head 44. The fluid materials flow from each material discharge container 32 A–C through the discharge hoses 46 A–C to the mixing head 44. The mixing head 44 combines the fluid materials into the settable mixture. A single hose 48 carries the settable material from the mixing head 44 to the mold valve 50 to begin filling the mold tool 12 with the settable mixture.

Figure 2A:
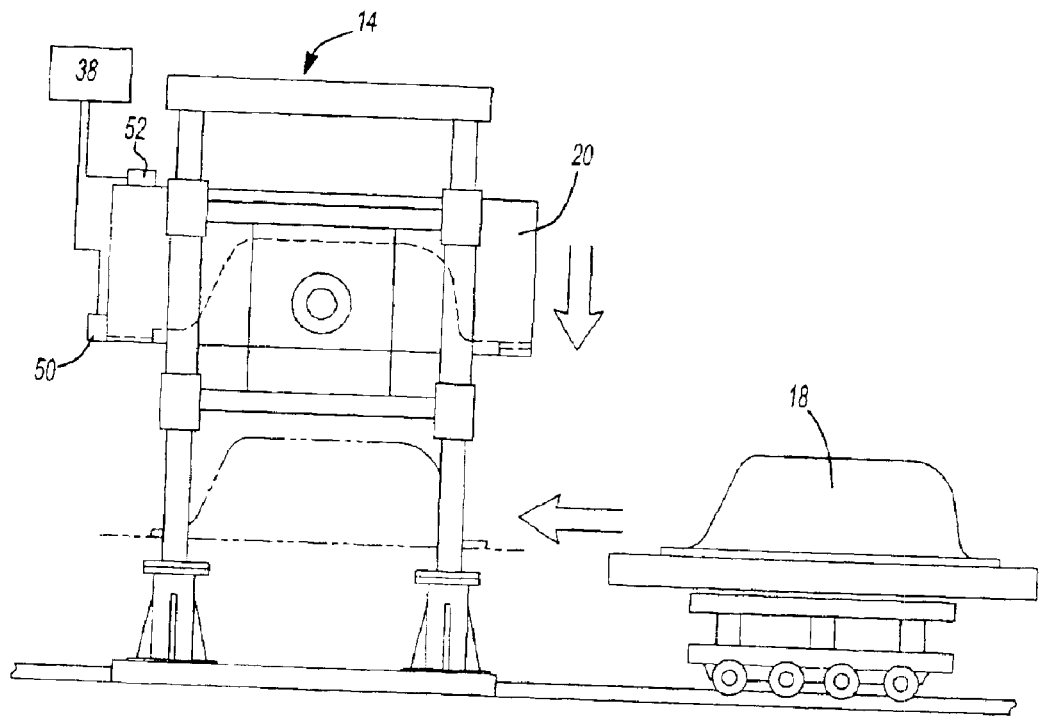
FIGS. 2A–D are schematic views of movement of the mold tool.
Figure 2B:
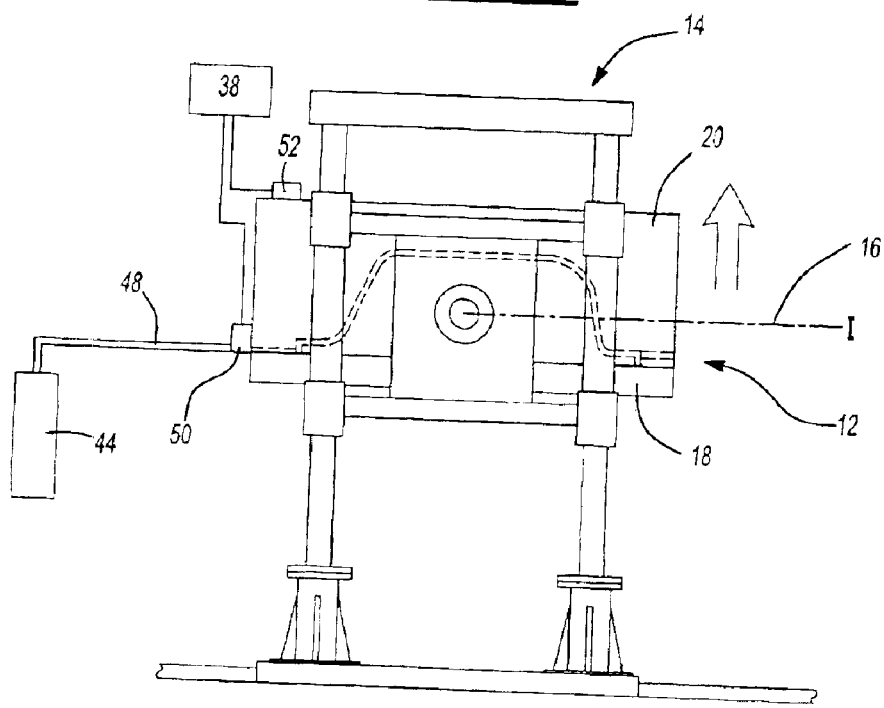
Figure 2C:
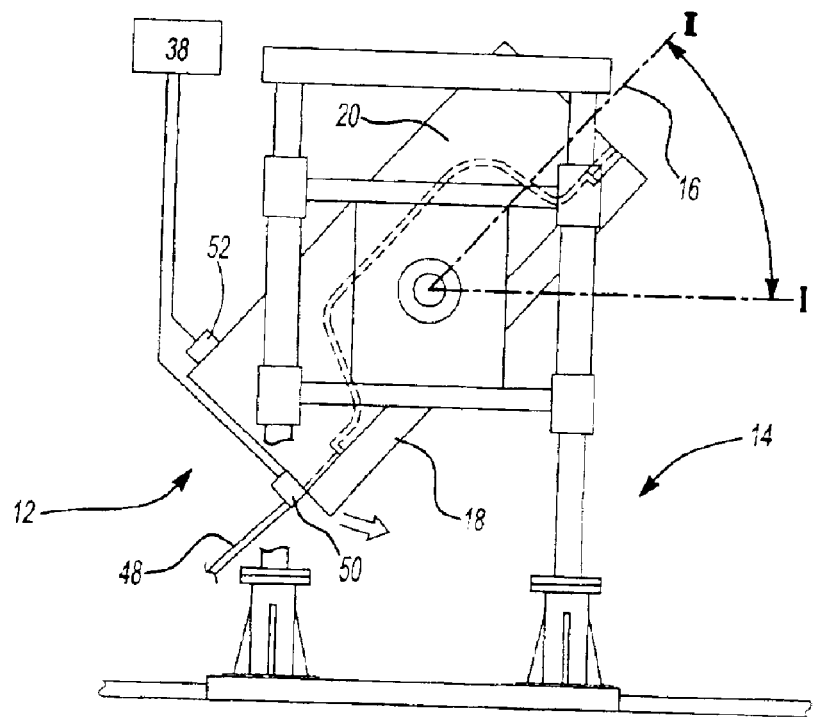
Figure 3A:
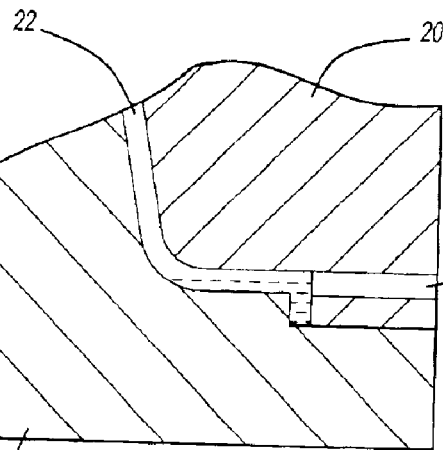
FIGS. 3A–C are schematic views of the air escape passage within the mold tool during rotation of the mold.
Figure 3B:
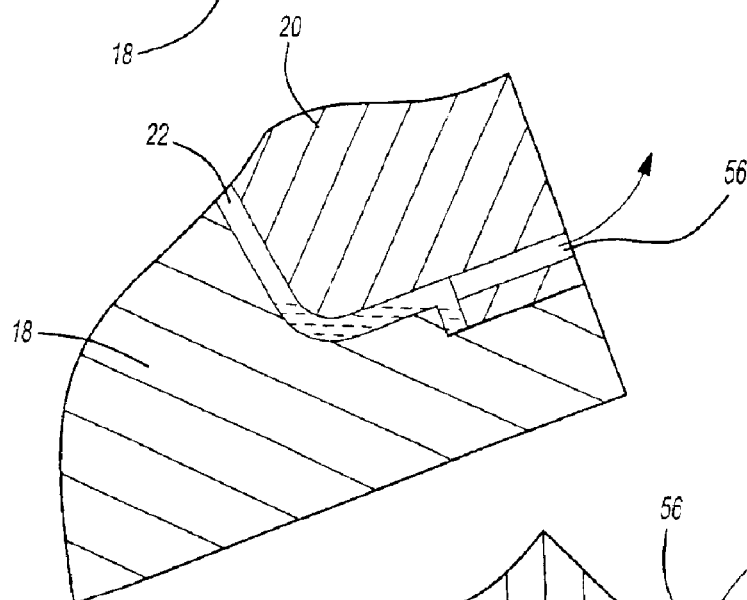
Figure 3C:
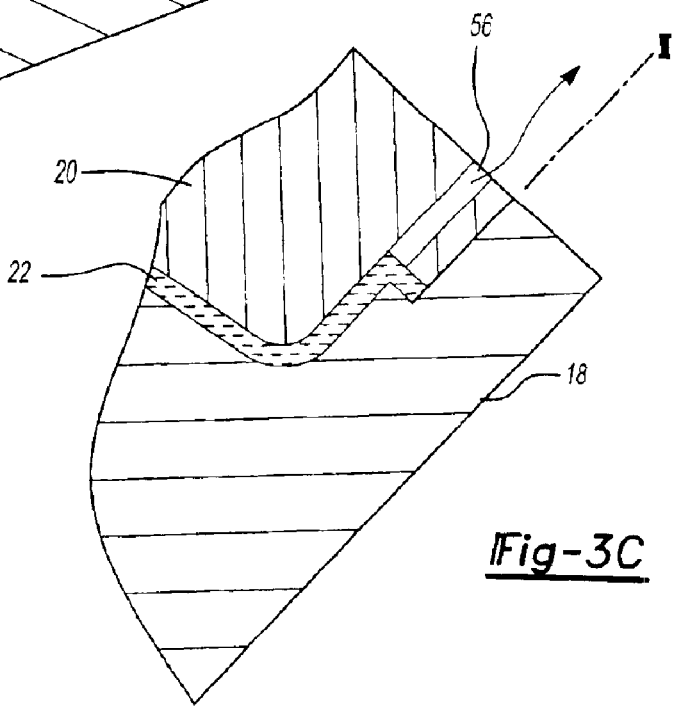

Referring now also to FIGS. 3 A–C as well as FIGS. 2A–C, during the filling step, the mold tool 12 is rotated about the horizontal axis 16 from the first position I, shown in FIGS. 2B and 3A, through an intermediate position, shown in FIG. 2B, to a second position II, shown in FIGS. 2C and 3C, to aid the evacuation of air from the cavity 22. Air trapped within the mold tool 12 exits through air escape passages 56 during rotation of the mold. As the cavity 22 becomes further filled with settable material, air can become trapped within contours of the cavity 22. Rotation of the mold tool 12 flushes out air trapped in such contours such that upon complete fill of the cavity 22, substantially all air is evacuated from the mold tool 12. Evacuation of the air from the mold tool 12 prevents air bubbles from being trapped within the finished molded article 24. The amount of rotation is determined by the shape and contours of the cavity 22 and the molded article 24. Further, the shape of the molded article 24 will determine how quickly and to what degree the mold tool 12 is to be rotated. The speed and degree of rotation would be understood by one skilled in the art to be application sensitive and thereby any rate and magnitude or rotation of the mold tool would be understood to be within the scope of this invention.

Referring to FIG. 1, during the filling of the mold tool 12, the sensors 52, 54 within the mold tool 12 monitor pressure levels of the settable mixture. The controller 38 receives information about pressure of the settable mixture within the cavity 22 of the mold tool 12 from the sensor 52. The discharge of the settable mixture is varied in response to changes in pressure within the mold tool 12. The controller 38 slows the race of discharge of the settable mixture proportionate to the increase in pressure. The greater the pressure within the mold tool 12, the slower the controller 38 operates the drive 42. The controller 38 controls the rate at which the drive 42 moves the pistons 40 within the material discharge containers 32A–C are driven downward to expel the fluid material for the settable mixture. Pressure increases in the mold tool 12 due to thickening of the settable mixture and because as the mold tool 12 fills the restriction to the flow of the settable mixture increases. The rate of discharge or injection speed of the settable mixture into the mold tool may vary during each discharge sequence in order to accurately control the discharge of the settable mixture into the mold tool 12. The changes in conditions such as mold temperature and settable material temperature are accommodated by varying the discharge rate in response to pressure within the mold tool 12.

The controller 38 shuts the mold valve 50 to interrupt flow of the settable mixture upon reaching a predetermined pressure level. The sensors 52,54 monitor the pressure level and will shut down the process if the pressure level deviates from a predetermined range. In this way, pressure spikes upward or downward indicating a problem during the molding process initiate a process shut down.

The method further includes the step of flushing the mixing head 44 of any settable mixture after completion of the filling step. The flushing step expels any settable mixture remaining in the mixing head 44 or the hose 48 to prevent hardened settable mixture from blocking the mixing head 44 or hose 48.

Figure 2D:
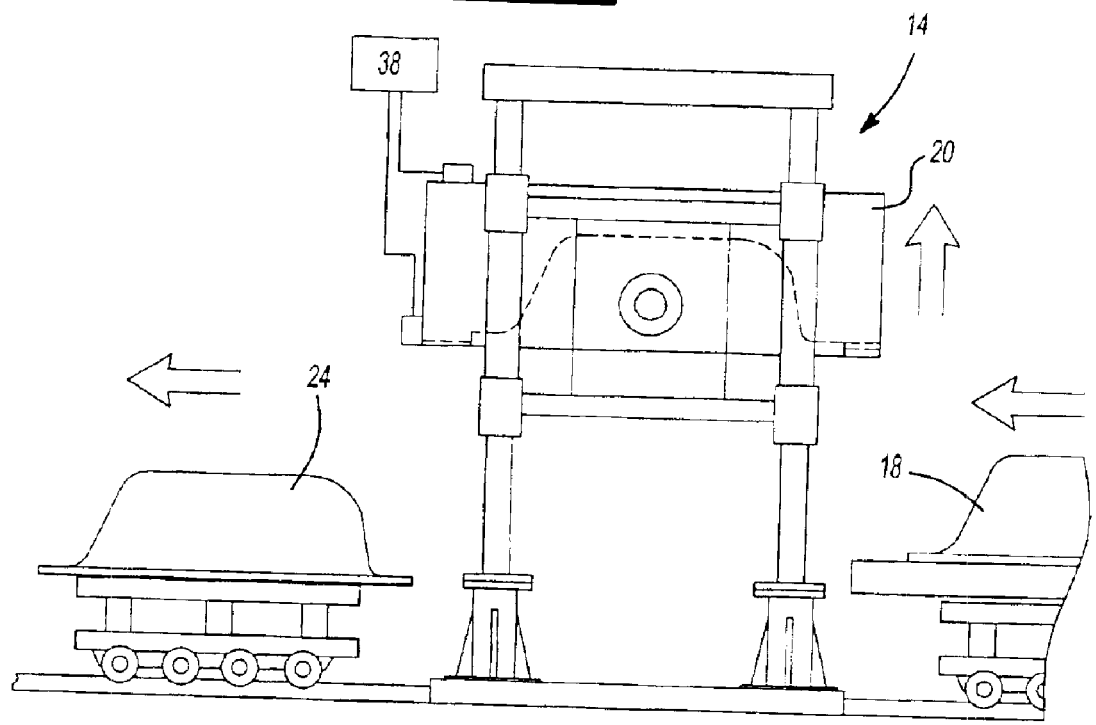

The hose 48 is disconnected from the mold valve 50 and the mold tool 12 is rotated to the first position about the horizontal axis 16 and the settable mixture is allowed to cure. Referring to FIG. 2D, the mold parts 18,20 are separated to allow the removal of the molded article 24. During the separation of the mold parts 18,20 air is applied to both sides to free the molded article. One part of the mold 12 is moved clear of the structure 14 to allow demolding of the molded article 24. Each of the mold parts 18,20 is then prepared for another molding sequence.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason, the following claims should be studied to determine the true scope and content of this invention.

What is claimed is:

1. A method of manufacturing a molded article from a settable mixture utilizing a mold tool, said method comprising the steps of:
    a. intaking a plurality of components of the settable mixture into a corresponding plurality of discharge containers, each of the plurality of discharge containers being sized relative to each other such that discharging one discrete shot from each of the plurality of discharge containers provides a predetermined ratio of each of the plurality of components required to form the settable mixture;
    b. discontinuing intake of the plurality of components upon filling of each of the plurality of discharge containers with a discrete shot of a separate component of the plurality of components;
    c. emptying the discrete shots from each of the plurality of discharge containers through the mixing head into a mold tool, wherein a settable mixture is formed in the mixing head;
    d. sensing a pressure of said settable mixture; and
    e. varying a rate of continued emptying of the settable mixture responsive to said pressure sensed in step d.

2. The method as recited in claim 1 including the step of rotating the mold tool during said steps c, d and e.

3. A method of manufacturing a molded article from a settable mixture utilizing a mold tool, said method comprising the steps of:
    a. intaking a plurality of components of the settable mixture into a corresponding plurality of discharge containers, each of the plurality of discharge containers being sized relative to each other such that discharging one discrete shot from each of the plurality of discharge containers provides a predetermined ratio of each of the plurality of components required to form the settable mixture;
    b. discontinuing intake of the plurality of components upon filling each of the plurality of discharge containers with a discrete shot of a separate component of the plurality of components;
    c. discharging the discrete shots from each of the plurality of discharge containers into the mixing head to form the settable mixture;
    d. discharging said settable mixture from the mixing head into the mold tool;
    e. sensing a pressure of said settable mixture; and
    f. varying continued discharge of the settable mixture responsive to said pressure sensed in step e.

4. The method of claim 3, further including the step of mixing said components in said mixing head to form the settable mixture.

5. The method of claim 3, wherein the pressure is measured at a point between the mixing head and the mold tool.

6. The method of claim 3, wherein the pressure is measured at a point within the mold tool.

7. The method of claim 3, wherein said step f, includes reducing a rate of said discharge of the settable mixture relative to an increase in pressure sensed in said step e.

8. The method of claim 3, further including the step of stopping the discharge of the settable mixture in response to reaching a predetermined pressure.

9. The method of claim 3, further including the step of stopping the discharge of the settable mixture in response to a pressure of said settable mixture being outside said predetermined pressure range.

10. The method of claim 3, wherein said step d, further comprises rotating the mold tool about an axis to evacuate air.

11. The method of claim 10, wherein said rotation of said mold tool is further defined by locating the mold tool in a first position prior to said step d, and rotating the mold tool to a second position during said step f.

12. A method of manufacturing a molded article comprising the steps of:
    a. intaking first, second and third components of a settable mixture into first, second and third material discharge containers, where said first, second and third material discharge containers are proportionally sized relative to each other such that discharging one discrete shot from each of the first, second and third discharge containers provides a desired ratio of each of said first, second and third components that form said settable mixture;
    b. discontinuing intake of the first, second and third components upon filling each of the first, second and third material discharge containers with a desired fill amount corresponding to a discrete shot of a separate one of the first, second and third components;
    c. discharging a settable mixture formed from the discrete shots of said first, second and third components of the settable mixture from each of the first, second and third material discharge containers into a mold tool at a pressure;
    d. rotating the mold tool about a horizontal axis during step c;
    e. sensing said pressure of said settable mixture; and
    f. adjusting said discharge of said settable mixture in response to changes in said pressure of said settable mixture.

13. The method of claim 12 wherein said step d, further defined by locating the mold tool in a first position prior to said step c, and rotating the mold tool to a second position during said step d.

14. The method of claim 12, wherein said step f, is further defined by slowing said discharge of settable mixture into the mold tool in response to an increase in pressure of said settable mixture.

15. The method of claim 12, wherein said step f, is further defined by stopping said discharge in response to attaining a predetermined pressure level of said settable mixture.

16. The method of claim 12, wherein said step (a.) is further defined by drawing a piston upward within each of said material discharge containers to fill said material discharge chambers.

17. The method of claim 12, wherein said step c, is further defined by mixing said components within a mixing head prior to discharge into said mold tool.

18. The method of claim 12, wherein said step c, is further defined by driving a piston downward within each of said material discharge containers to discharge said components into said mold tool.

19. The method of claim 18, wherein said step f, is further defined by adjusting said discharge of said settable mixture by changing a rate that said piston is driven downward within said material discharge chambers.

* * * * *